Aug. 28, 1956  J. F. NAYLOR  2,760,449
STAMPING, CUTTING OR EMBOSSING MACHINES
Filed July 14, 1953  2 Sheets-Sheet 1
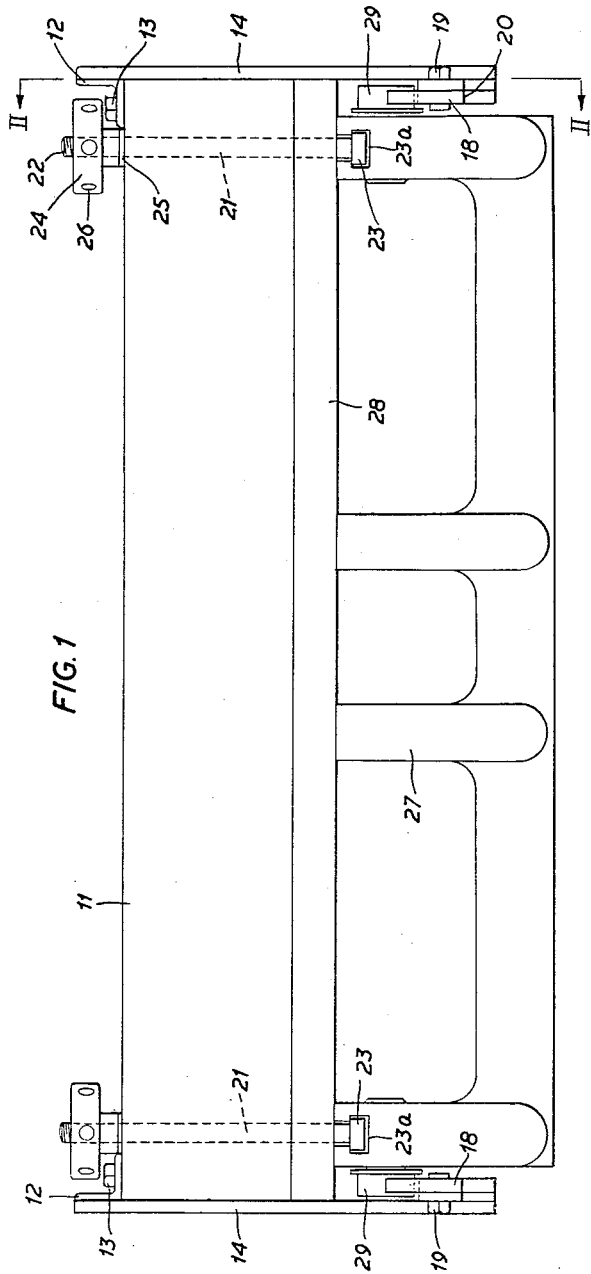
Inventor,
JOSEPH FRANCIS NAYLOR
By
Attorney

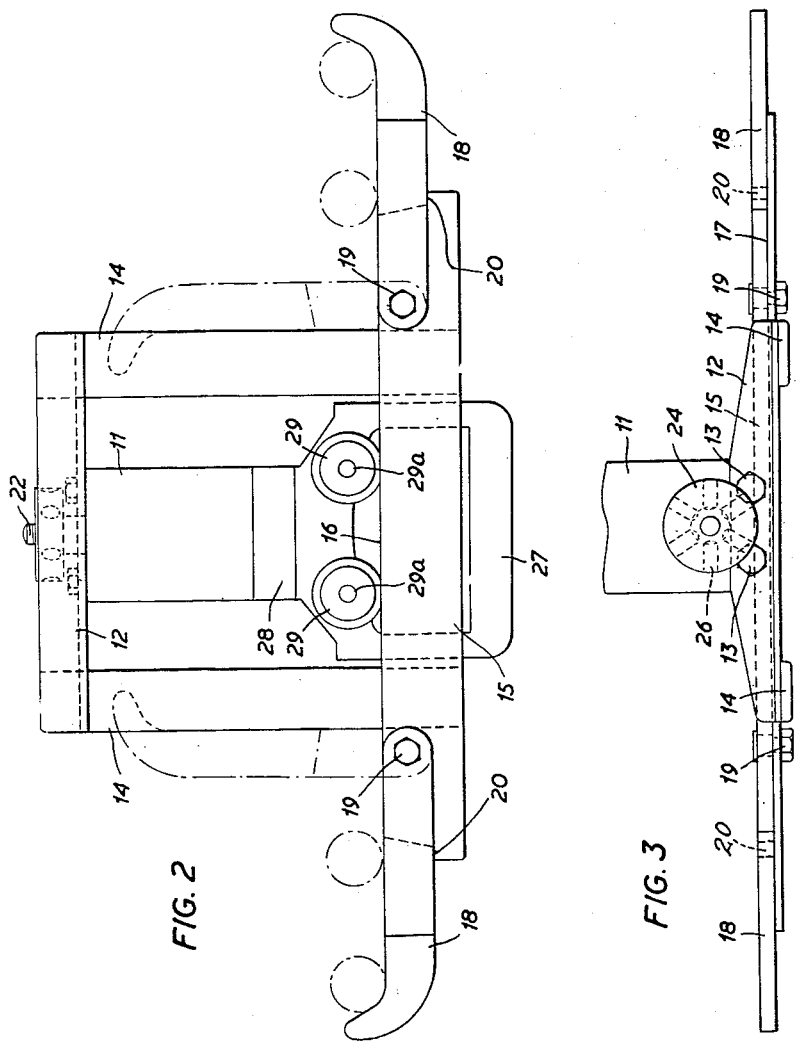

United States Patent Office 2,760,449
Patented Aug. 28, 1956

2,760,449

STAMPING, CUTTING, OR EMBOSSING MACHINES

Joseph Francis Naylor, Newton-le-Willows, England, assignor to T. & T. Vicars Limited, Newton-le-Willows, England, a British company Application July 14, 1953, Serial No. 367,800

Claims priority, application Great Britain July 16, 1952

5 Claims. (Cl. 107—24)

The present invention relates to stamping, embossing or cutting machines wherein a reciprocating crosshead is arranged to receive a heavy member carrying the cutting, embossing or the like tools, which member is displaced with the crosshead to perform a cutting, embossing or the like operation on a sheet or web.

The invention is particularly suitable for application to the cutting or embossing tools of biscuit making machinery, and is further described in its application thereto.

In prior machines for cutting individual dough portions from a continuous sheet of dough for the manufacture of biscuits therefrom and/or to emboss such articles, the interchange of the cutting or embossing tools has been a matter of some difficulty. It has been usual to mechanically lift the tools, which often are of considerable weight, and deposit them on a piece of canvas which has been previously placed on the cutting web and then pull both canvas and tools horizontally into a position from which the tools can be raised and secured to the vertically reciprocating crosshead.

An object of the present invention is to simplify the procedure necessary for this operation and to reduce the time involved.

According to the present invention, the reciprocating crosshead is provided with guide rails extending laterally therefrom on at least one side thereof, and the member carrying the cutting, embossing or the like tools is provided with supporting rollers or the like elements engageable with said rails, whereby, on assembly of said member to the crosshead, to enable said member to be landed on said rails to one side of the crosshead and to be rolled along the rails into alignment with means for attachment of said member to the crosshead.

In a preferred form of construction, the tool carrying member is provided with pairs of rollers on opposite sides thereof and further the guide rails have hinged lateral extensions with which, in their lowered position, the pairs of rollers are engageable respectively for the purpose of supporting the member clear of the crosshead prior to attachment of the member thereto. The advantage of hinged extensions is that when they are not in use, they may be folded back about the hinge to an unobtrusive position against the crosshead. Such hinged extensions may be in the form of self-supporting latches when in the lowered position, that is to say they may be supported by part of the crosshead itself, but readily swung up from this position, and such extensions or latches may have stops, for example horned ends, remote from the crosshead, so that once the member carrying the cutters, embossing tools or the like has been lowered thereon, there is little risk that this may run off the guide rails away from the crosshead.

The invention will be further described with reference to a typical crosshead as used in the type of machine aforesaid and provided, in accordance with the invention, with a particular arrangement and construction of guide rails, taken by way of example only, as illustrated in the accompanying drawings wherein:

Fig. 1 is a front elevation of the crosshead with the tool carrying member rigidly attached thereto, Fig. 2 is a cross section taken on the line II—II of Fig. 1, and Fig. 3 is a detail plan view of one end of the crosshead omitting the tool carrying member.

At each of the ends of the upper surface of a rectangular section crosshead 11 are mounted brackets 12 of lengths of angle section girder by means of bolts 13 screwed into blind tapped holes in the crosshead 11. An example of the manner in which the crosshead is supported and reciprocated is to be found in Crosland's Patent No. 2,544,527. The brackets 12 are mounted at right angles to the longitudinal axis of the crosshead 11 to lie projecting symmetrically to either side thereof and to the projecting ends are secured dependent strips 14. Secured to the lowermost ends of each pair of strips 14 is a guide rail 15 extending horizontally between and beyond each pair of strips and having a straight upper track surface 16. The terminal ends of the guide rails 15 are shelved on their inwardly directed side faces as designated generally at 17 to accommodate lateral extensions 18 mounted pivotally by the bolts 19 to the guide rails 15. The shelves provide an abutment surface 20 to support the extensions 18 in their lowered position wherein the upper surfaces of the extensions 18 form a linear continuation of the guide rail track 16. The extensions 18 may be turned about the pivotal point at the bolts 19 from the lowered position into an inoperative position in which they lie preferably as shown by chain lines in Fig. 2, and means (not shown) is provided to hold them in the inoperative position.

The extensions 18 are formed with horned ends remote from the crosshead to act as stops in the path of the track 16 and thus to prevent rollers running on the track from overshooting the length thereof.

The crosshead 11 has bores 21 at each end passing therethrough on the vertical centre line and located within these bores are long bolts 22 having T heads 23. On the upper threaded end of the bolts 22 are screwed capstan nuts 24 seated on washers 25 and provided with radial holes 26 to receive purchase spokes. The T heads 23 of the long bolts 22 are adapted to engage in corresponding T slots 23a in a member or block 27 which carries the cutting, embossing or the like tools together with such scrap ejector mechanisms as may be associated therewith, the tools and said mechanisms not being illustrated. A making-up piece 28 is shown interposed between the crosshead 11 and the block 27 for the purpose of adjusting, by virtue of its thickness, the position of the block relative to the crosshead, as may be necessary where the depth of block and the nature of the tools carried thereby are various.

The block 27 has pairs of rollers 29 at opposite ends mounted thereto by pins 29a, each roller being flanged peripherally adjacent to the block 27.

The operation of assembly of the block 27 to the crosshead 11 is executed as follows: The block 27 is landed, for instance with lifting tackle, on to the lowered extensions 18 to one side of the crosshead with the rollers 29 engaging the track of the extensions substantially in either one of the positions implied by the chained outlines of the rollers shown in Fig. 2. The block is then rolled along the track whilst simultaneously the T heads 23 of the long bolts 22 slide into the T slots 23a of the block. When the block is aligned with the crosshead, the capstan nuts 24 are rotated to raise the block from the guide rails 15 until the block is rigidly secured to the crosshead with the rollers clear of the guide rails 15 as is shown in Figs. 1 and 2. The extensions 18 may then be folded back into their inoperative position. The reverse operation applies for detachment of the block from the crosshead.

I claim:

1. In a machine of the type wherein a reciprocating crosshead is arranged to receive a heavy member carrying cutting, embossing or the like tools and which member is displaced with the crosshead to perform a cutting, embossing or the like operation, guide rails mounted on said crosshead to extend laterally therefrom on at least one side thereof, antifriction elements mounted on said member and positioned to be engageable with said rails, and means provided on said crosshead serving to rigidly attach said member thereto, whereby, on assembly of said member to said crosshead, to enable said member to be landed for support on said rails to one side of said crosshead with said anti-friction elements engaging said rails as aforesaid and to be rolled along said rails into alignment with said means.

2. In a machine of the type wherein a reciprocating crosshead is arranged to receive a heavy member carrying cutting, embossing or the like tools and which member is displaced with the crosshead to perform a cutting, embossing or the like operation, a pair of relatively spaced guide rails mounted on said crosshead to extend laterally therefrom on at least one side thereof, pairs of rollers rotatably mounted on opposite sides of said member, each pair of said rollers being positioned to be engageable simultaneously with respective rails of said pair of rails, and means provided on said crosshead serving to rigidly attach said member thereto, whereby on assembly of said member to said crosshead, to enable said member to be landed for support on said rails to one side of said crosshead with said rollers engaging said rails as aforesaid and to roll said member into alignment with said means, at least the portion of each of said guide rails on which said member is supported when aligned with said means being in fixed relationship with said crosshead.

3. In a machine of the type wherein a reciprocating crosshead is arranged to receive a heavy member carrying cutting, embossing or the like tools and which member is displaced with said crosshead to perform a cutting, embossing or the like operation, the combination of a pair of relatively spaced guide rails mounted on said crosshead, extension pieces included as part of said rails hinged thereto and adapted to extend laterally from said crosshead on at least one side thereof, holding means for said extensions to present a straight track on said rails, pairs of rollers rotatably mounted on opposite sides of said member, each pair of said rollers being positioned to be engageable simultaneously with respective rails of said pair of rails, and means provided on said crosshead serving to rigidly attach said member thereto, whereby, on assembly of said member to said crosshead, to enable said member to be landed for support on said rails to one side of said crosshead with said rollers engaging said rails as aforesaid and to roll said member into alignment with said means.

4. In a machine of the type wherein a reciprocating crosshead is arranged to receive a heavy member carrying cutting, embossing or the like tools and which member is displaced with said crosshead to perform a cutting, embossing or the like operation, the combination of a pair of relatively spaced guide rails mounted on said crosshead, extension pieces included as part of said rails hinged thereto and adapted to extend laterally from said crosshead on at least one side thereof, abutment surfaces for said extensions provided on said crosshead to support said extensions in a position presenting a straight track on said rails, pairs of rollers rotatably mounted on opposite sides of said member, each pair of said rollers being positioned to be engageable simultaneously with respective rails of said pair of rails, and means provided on said crosshead serving to rigidly attach said member thereto, whereby, on assembly of said member to said crosshead, to enable said member to be landed for support on said rails to one side of said crosshead with said rollers engaging said rails as aforesaid and to roll said member into alignment with said means.

5. In a machine of the type wherein a reciprocating crosshead is arranged to receive a heavy member carrying cutting, embossing or the like tools and which member is displaced with said crosshead to perform a cutting, embossing or the like operation, the combination of a pair of relatively spaced guide rails mounted on said crosshead, extension pieces included as part of said rails hinged thereto and adapted to extend laterally from said crosshead on at least one side thereof, abutment surfaces for said extensions provided on said crosshead to support said extensions in a position presenting a straight track on said rails, stops in the path of said track provided on said extensions at the free ends thereof, pairs of rollers rotatably mounted on opposite sides of said member, each pair of said rollers being positioned to be engagable simultaneously with respective rails of said pair of rails, and means provided on said crosshead serving to rigidly attach said member thereto, whereby, on assembly of said member to said crosshead, to enable said member to be landed for support on said rails to one side of said crosshead with said rollers engaging said rails as aforesaid and to roll said member into alignment with said means.

References Cited in the file of this patent

UNITED STATES PATENTS

| | | |
|---|---|---|
| 2,317,851 | Fullerton | Apr. 27, 1943 |
| 2,344,692 | Fullerton | Mar. 21, 1944 |
| 2,544,527 | Crosland | Mar. 6, 1951 |